United States Patent [19]

Gibson et al.

[11] 4,105,327

[45] Aug. 8, 1978

[54] MULTIPLE REDUCTION INDICATORS FOR CONTINUOUSLY VARIABLE REDUCTION COPIER MACHINES

[75] Inventors: David Kent Gibson; Myrl J. Miller, both of Boulder; Spencer Allan Snell, Lyons, all of Colo.

[73] Assignee: International Business Machines Corporation, Armonk, N.Y.

[21] Appl. No.: 749,137

[22] Filed: Dec. 9, 1976

[51] Int. Cl.[2] ........................ G03B 27/36; G03B 27/38

[52] U.S. Cl. ........................................ 355/59; 355/61; 355/75

[58] Field of Search .................................... 355/55-59, 355/61, 44, 71, 75

[56] References Cited

U.S. PATENT DOCUMENTS

| | | | |
|---|---|---|---|
| 2,256,397 | 9/1941 | Luboshez | 355/57 X |
| 2,927,503 | 3/1960 | Zollinger | 355/57 |
| 3,288,022 | 11/1966 | Swanson | 355/59 X |
| 3,897,148 | 7/1975 | Ritchie et al. | 355/57 |

FOREIGN PATENT DOCUMENTS

| | | | |
|---|---|---|---|
| 967,796 | 5/1975 | Canada | 355/55 |
| 1,935,618 | 2/1971 | Fed. Rep. of Germany | 355/55 |

*Primary Examiner*—Richard A. Wintercorn
*Attorney, Agent, or Firm*—Charles E. Rohrer

[57] ABSTRACT

A continuously variable reduction optical system for document copiers wherein a plurality of sets of reduction indicators are provided, each set corresponding to a particular size copy paper. Each set of indicators can be moved by the operator to frame the document to be copied and simultaneously the reduction optical system is set to provide proper adjustment for all system parameters. The indicators are continuously viewable by the operator. An embodiment is disclosed wherein each indicator is positioned so that reduction ratio is maintained whatever the copy paper size.

5 Claims, 4 Drawing Figures

MULTIPLE REDUCTION INDICATORS FOR CONTINUOUSLY VARIABLE REDUCTION COPIER MACHINES

This invention relates to document copier machines and more specifically to operator-viewable indicators which inform him of the area of the document glass to be copied in a continuously variable reduction copier machine. This patent application incorporates by reference U.S. patent application Ser. No. 721,125; filed Sept. 7, 1976. Related patent applications include U.S. patent application Ser. No. 721,124; filed Sept. 7, 1976; and U.S. patent application Ser. No. 729,123; filed Dec. 9, 1976.

BACKGROUND OF THE INVENTION

Most reduction machines in the prior art provide discrete reduction ratios, i.e., two or three reduction settings such as 75% and 66%, which enable reduction copying at only those particular ratios. This type of machine is sometimes wasteful since a document which is too big to be reduced to the copy paper size at 75% may nevertheless be copied at that setting before the operator is able to determine the necessity of moving to the greater reduction ratio. In a continuously variable reduction machine, some indication of the area of the document glass to be copied for any particular reduction setting is a necessity since the infinite variation in settings between the boundaries could result in numerous copies of either not enough reduction or too much reduction if no indicators are used. This problem was recognized in the prior art in U.S. Pat. No. 3,395,610, FIG. 16 thereof, which uses a reduction indicator, continuously variable in position, to signal one boundary of the document area to be copied. This indicator is operator viewable through the document glass. Similarly, U.S. Pat. No. 2,927,503; FIG. 15 thereof, shows rails which are continuously variable to frame the area of the document glass to be copied, the rails visible through the document glass.

In a continuously variable reduction machine there are two factors affecting the choice of reduction ratio: first is the document size and second is the copy paper size. In the prior art mentioned above, U.S. Pat. No. 2,927,503 operates so that in all formats the middle of the document is automatically copied onto the middle of the copy paper. The machine disclosed does not appear to be capable of utilizing two different sizes of copy paper, but were such the case, and if the indicators were coordinated with the smaller copy paper size, the larger copy paper size would always be unfilled at the edges. Similarly, in U.S. Pat. No. 3,395,610; the machine does not appear to be designed for use with two different copy paper sizes. Were it so designed, again the larger copy paper would always be unfilled. In fact, in this particular machine, even the smaller size copy paper is unfilled since overreduction is always practiced.

Therefore, it is the primary object of the instant invention to provide indicators for continuously variable reduction apparatus capable of utilizing two or more different sizes of copy paper.

SUMMARY OF THE INVENTION

This invention provides a plurality of sets of reduction indicators, each set corresponding to a particular size copy paper, the indicators being continuously movable under operator control and continuously viewable by the operator, even with the document cover closed, so that the operator can position a selected set of indicators so that reduction ratio adequate to frame the document to be copied. The mechanism simultaneously positions the optics to provide continuously variable reduction in accordance with indicator position.

BRIEF DESCRIPTION OF THE DRAWINGS

The above-mentioned and other features and objects of this invention and the manner of attaining them will become more apparent and the invention itself will best be understood by reference to the following description of embodiments of the invention taken in conjunction with the accompanying drawings, the description of which follows.

DETAILED DESCRIPTION

For the complete detail of a continuously variable reduction drive system, please refer to U.S. patent application Ser. No. 721,125; filed Sept. 7, 1976 which is incorporated herein by reference.

Figure 1:
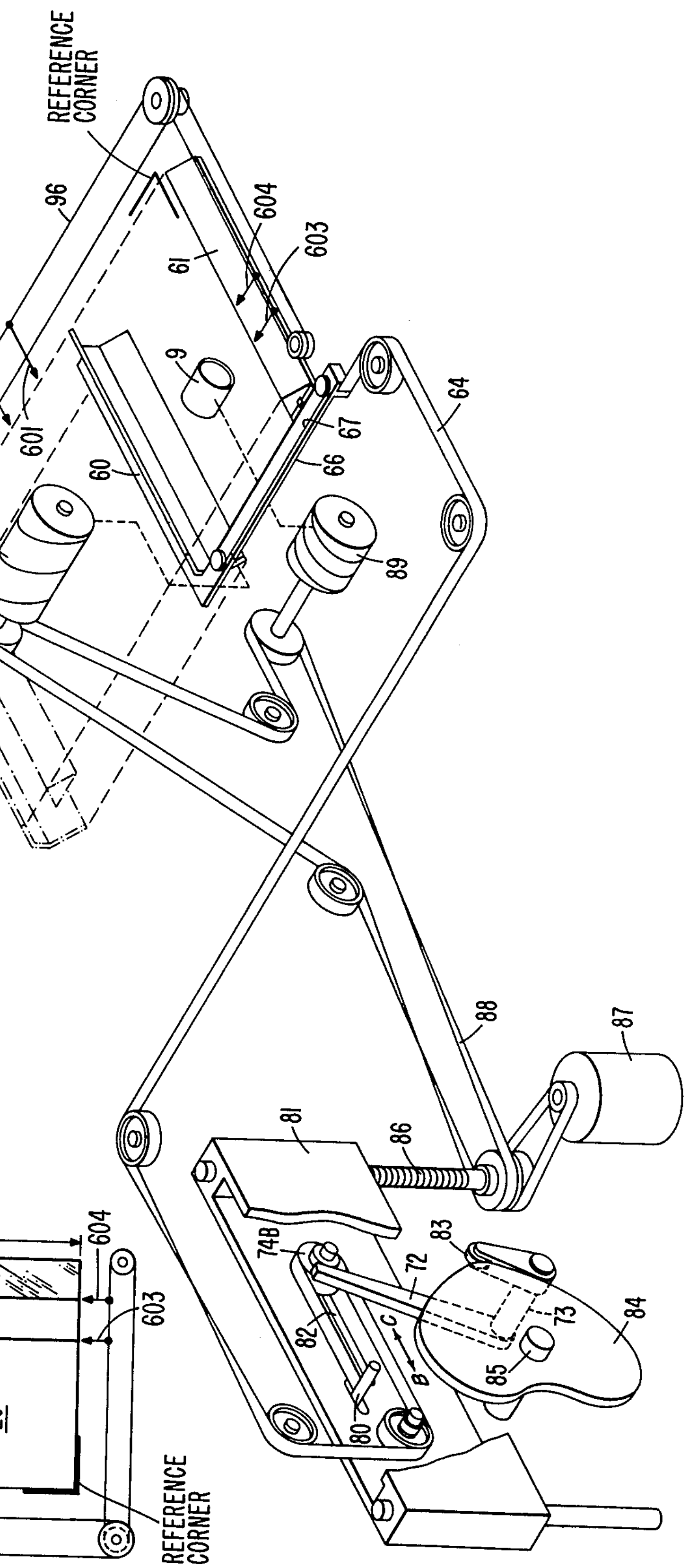
FIG. 1 shows an embodiment of the invention on a continuously variable reduction drive system.

FIG. 1 is the same as FIG. 5 of the patent application mentioned above, incorporated by reference, with the exception that multiple-reduction indicators are included in accordance with the teachings of this invention. In the system shown in FIG. 1, a positioning motor 87 is operative to adjust various elements of the optical system to provide the desired reduction ratio in accordance with a command from the operator prior to pressing the "start print" pushbutton and making a copy. Energization of motor 87 is under the control of the operator from a simple forward and reverse circuit (not shown). By pressing, for example, the forward button, the motor 87 is energized to encompass a greater and greater area of the document glass within the reduction indicators and reduce that area to the size of the selected copy paper. By pressing the reverse pushbutton, the operator can reverse the direction of the indicators to encompass a smaller and smaller portion of the document glass until finally it reaches a portion of the document glass sized exactly to the size of the copy paper, and thus a 1:1 reduction ratio is set. Reduction indicators are shown at 601, 602, 603, and 604.

As motor 87 is energized, lead screw 86 is turned to move truck 81 in a vertical direction. As truck 81 moves, follower pulley 74B is carried in the vertical direction thus assuming different positions along drive arm 72. Drive arm 72 is connected through shaft 73 to cam follower 83, which is rotated under the influence of cam 84, which in turn is driven by the main motor (not shown) through shaft 85. As cam 84 is rotated, drive arm 72 is moved in the directions B and C, causing follower pulley 74B to be moved in a reciprocating manner. The amount of movement and speed of movement depends upon the vertical positioning of follower 74B along drive arm 72. Slot 82 is provided in truck 81 for holding the follower pulley 74B in position relative to truck 81. Drive cable 64 is connected to a movable ground point 80 around follower pulley 74B and at the other end is connected to an optics scanning carriage 60 along arm 66. In that manner, as follower pulley 74B is moved by drive arm 72 in a reciprocating manner, scanning carriage 60 moves with it. Scanning carriage 61 is connected by a cable 67 to scanning carriage 60 and thus it is also moved.

Prior to the action of driving the scanning carriages across the document glass in the manner just described, positioning motor 87 performs other functions in addition to the positioning of the truck 81. FIG. 1 shows that the positioning cable 88 is turned by motor 87 to position the lens 9 under the influence of cam 89. Additionally, to keep the image in focus, a focal adjustment is made to the total conjugate length by moving carriage 60 relative to carriage 61 under the influence of cam 90. Simultaneously with the magnification and total conjugate length (TCL) adjustments, pulley 125 and cable 94 are rotated to turn pulley 95. In that manner, cable 96 and reduction indicators 601 and 602 are moved. Synchronous with this movement reduction indicators 603 and 604 are also positioned.

Figure 1A:
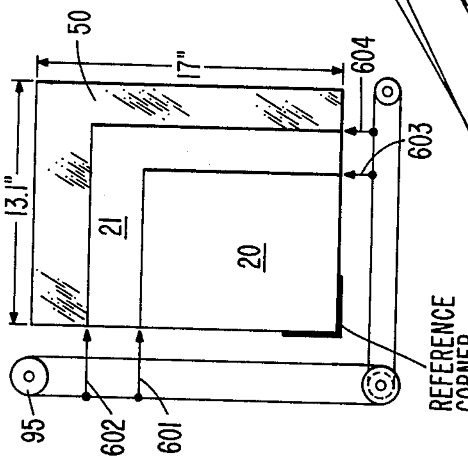
FIG. 1*a* shows the document glass with the reduction indicators.

With reference to FIG. 1*a*, it may be observed that indicators 601 and 603 frame document 20 while indicators 602 and 604 frame document 21. The document glass 50 is shown to be 13.1 × 17 inches. This shows that the documents 20 and 21 are positioned against a reference corner. We may assume that the document 20 represents exactly the size of the copy paper in the copy paper bin. We may assume further that that copy paper is the A-4 size, i.e., 8.268 × 11.693 inches. Further, let us assume that document 21 is exactly the size of the second size of copy paper which can be placed in the copy paper bin and further let us assume that the second size copy paper is B-4, i.e., 11.693 × 14.331 inches. With these assumptions in place, it is apparent that FIG. 1*a* shows a machine setting for 1:1 reduction, where the indicators encompass a document size area which is exactly the same as the size of the copy paper. Thus, the resultant copy will look the same as the document being copied.

Suppose now that a document larger than document 20 is to be copied and A-4 size copy paper is in use. To encompass the needed document area, the operator will press the reduce button, driving indicators 601 and 603 outwardly toward the positions now occupied by indicators 602 and 604. Simultaneously, of course, indicators 602 and 604 will also advance outwardly. When the document is encompassed by the reduction indicators 601 and 603, the operator is assured that when he presses his "make copy" pushbutton, the entirety of the document to be copied will be found on the copy paper, albeit in reduced form.

In a similar manner, when B-4 copy paper is in the copy paper bin, reduction indicators 602 and 604 can be moved outwardly by the operator until they encompass the entirety of the document to be copied. In that manner, the operator is assured that the resulting copy will contain the entirety of the material of the document to be copied and no trial runs need be made to find out whether a sufficiently great reduction has been selected.

In modern machines it is desirable to utilize automatic document feeds in which the document glass remains covered throughout the feeding of the documents. To assure the operator that he has selected a proper area to be copied, it is desirable to place the indicators 601–604 in a transparent area outside the document glass so that the glass itself can remain covered and the indicators remain visible. Such an apparatus is obviously easy to obtain through the organization of components shown in FIG. 1*a*.

A problem exists with the system shown in FIGS. 1 and 1*a*, however, in that the indicators for B-4 size paper are operated from the same drive cable as the indicators for the A-4 size paper. In this situation, suppose that A-4 is the dominant size and B-4 is the option. The mechanism is designed to have indicator 601 at 11.693 inches from the reference corner and indicator 602 is installed at 14.331 inches from the reference corner. These indicators are fixed to each other on the same cable and driven simultaneously by the same motion source in the manner previously described. Therefore, if the indicator 601 moves 1 inch, the indicator 602 also moves 1 inch. Note that since the basic size of the machine is A-4, a 1-inch movement represents a reduction of 11.693/12.693 = 0.921. However, it must be remembered that while indicator 602 now encompasses 15.331 inches, a 0.921 reduction on 15.331 is 14.12 inches, not the original 14.331. Therefore, the copy paper which is 14.331 inches in size is filled only to 14.12 inches and the result is overreduction of the document glass area encompassed by the indicators 602 and 604.

If the B-4 indicator 602 is moved out to 17 inches, the largest document which can be placed on document glass 50, the indicator 602 will have moved 17 − 14.331 = 2.669 inches. This amount of movement represents an actual reduction of 11.693/(11.693 + 2.669) = 0.814. The result on a 17-inch document is 0.814 × 17 = 13.84 inches instead of the desired 14.331 inches, and therefore an overreduction has occurred of 0.49 inches which is the worst case of overreduction for this particular example.

As another example, suppose that the machine is set up to do 8.5 × 11-inch paper and 8 × 10.5-inch U.S. Government paper. Suppose further that the basic size for the machine is the 8.5 × 11-inch paper and the secondary indicators are placed at the inside positions. With reference to FIG. 1*a*, indicators 602 and 604 represent the basic size, while indicators 601 and 603 represent the secondary size. In this case, if the primary indicator 602 is moved 1 inch, the secondary indicator 601 also moves 1 inch. But, since the basic size of the machine is 11 inches, the 1-inch movement is a reduction of 11/(11 + 1) = 0.917. Again, this will be the same reduction for the indicator 603 which also moved 1 inch. However, a 0.917 reduction on 11.5 inches is 10.54, not the 10.5 desired. In this case, the error is 0.04 inches and represents a loss of information since the indicator represents an underreduction. To summarize, in this instance, as indicators 601 and 603 are moved outwardly by the operator to encompass the paper, he may not actually copy all of the information that he wished to copy since an underreduction is present. Therefore, we may conclude that to utilize the embodiment shown in FIG. 1 without running into the problem of underreduction, the machine must be designed with the smaller size paper as the basic size, using the inside indicators 601 and 603. In this case, the use of the larger size copy paper may sometimes result in overreduction but in all cases no information is lost.

Figures 2, 2A:
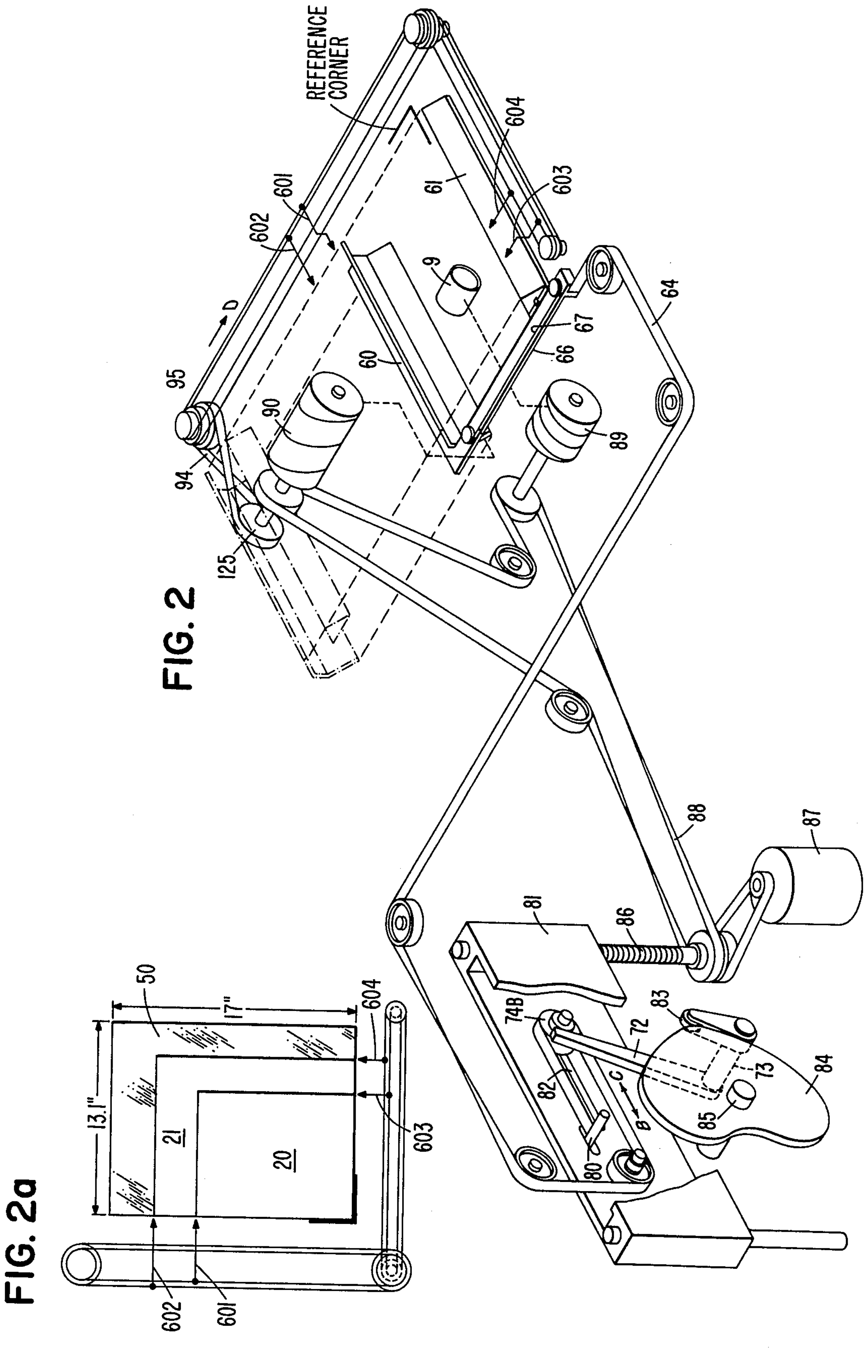
FIG. 2 shows another preferred embodiment of the invention together with a continuously variable reduction drive system.
FIG. 2*a* shows the document glass with the reduction indicators.

FIG. 2 is the preferred embodiment of this invention which remedies the problem just described. In this arrangement the indicators for the A-4 size paper, 601 and 603, are driven from pulleys which are different in size from the pulleys which are driving indicators 602 and 604. Thus, with the positioning of the lens 9 at specific magnification ratios, indicators 601 and 603 are moved to encompass the correct document area on document glass 50, corresponding to the reduction ratio, and indicators 602 and 604 are simultaneously moved to encompass a different portion of the document glass 50 but still with the correct reduction ratio such that either size copy paper is completely filled at any reduction setting.

For example, utilizing A-4 copy paper as the base size and B-4 copy paper as the alternate size, suppose that reduction indicator 602 is moved outwardly until it encompasses the entirety of the document glass, i.e., it is moved to 17 inches. Since it originally started at 14.331 inches, the amount of movement for reduction indicator 602 is 2.669 inches. To reduce 17 inches to 14.331 inches a ratio of 0.843 must be established by lens 9. At the same time, reduction indicator 604 is moved outwardly to encompass the smaller dimension of the B-4 size paper. In this instance, at 0.843 reduction, indicator 604 will move outwardly a distance of 1.884 inches to a distance of 12.002 inches from the reference edge.

Simultaneously with the above, reduction indicators 601 and 603 for the A-4 size paper will also move outwardly. In order to match the 0.843 setting of lens 9, reduction indicator 601 must move outwardly to a setting of 13.871 inches, which is a distance of 2.178 inches. Simultaneously, reduction indicator 603 will move outwardly to 9.808 inches, a distance of 1.54 inches from the original setting.

To compare these distances, note that reduction indicator 601 moved 2.178 inches while reduction indicator 602 was moving 2.669 inches. Similarly, while reduction indicator 603 moved 1.54 inches, reduction indicator 604 moved 1.884 inches. Thus it is seen that for the same reduction ratio the indicators for the B-4 size paper must move further than the indicators for the A-4 size paper. This distance of movement in the instant embodiment, shown in FIG. 2, is obtained simply through the use of different size pulleys to guide the respective indicators. An alternative embodiment is to mount the indicators on carriages which are moved by means of gears travelling along racks. By adjusting the number of teeth on the gears and racks moving the respective carriages, the proper ratio of movement may be obtained. At any rate, the direct source of movement for the various reduction must be made individual to accomplish the variable motion required.

It is manifest that if one wishes to use A-4 size copy paper, he would not want to make the mistake of using the reduction indicators for B-4 size copy paper when making his copy. Therefore, it is desirable to provide a mechanism such as indicator lights for use as indicators 601–604 with particular lights energized according to the size of paper placed in the copy paper bin. For example, if A-4 size copy paper were placed in the bin, a paper length sensor can energize indicator lights 601 and 603, or conversely, if B-4 size copy paper were placed in the copy paper bin, paper length sensing mechanisms can energize indicator lights 602 and 604. Circuits for such an arrangement have not been illustrated since they are obviously well within the skill of the art.

While the invention has been described with reference to two copy paper sizes, it is clear that the principles of this invention can be extended to as many copy paper sizes as desired. For example, a machine can be constructed according to the principles of this invention with four sizes of copy paper — U.S. Government size paper of 8 × 10.5 inches, standard U.S. paper of 8.5 × 11 inches, as well as the customary European and Japanese sizes A-4 and B-4. Also, while the invention has been described in the context of a system in which documents are corner referenced, it is clear that the invention could equally well be used in a system in which the documents are referenced along a single edge such as illustrated in U.S. patent application Ser. No. 721,124; filed Sept. 7, 1976. Note also that the description herein has keyed on the reduction of documents while it is clear that the invention applies equally well to the magnification of documents. In fact, the words magnification and reduction may be considered alternative expressions of what is essentially the same optical phenomenon.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A document copier machine capable of continuously variable reduction of documents to a plurality of copy paper sizes, comprising:

a glass platen upon which said document to be copied is placed;

an optics system for directing illumination from said document to produce an image thereof for transfer to a selected size of copy paper;

a plurality of sets of operator-viewable, movable reduction indicators, each set associated with a particular copy paper size; and an optics positioning system including means for adjusting the position of the multiple sets of indicators to frame areas of said glass platen, and including means for adjusting said optics system to provide an image of the framed areas of said glass platen in a size approximating the associated copy paper size, whereby the operator can adjust the position of said indicators to achieve a copy of the document.

2. The machine of claim 1 wherein the smallest size copy paper used in said machine is selected as the basic size for calculation of reduction ratio, consequently wherein said optics positioning system positions said optics and said indicators accordingly.

3. The machine of claim 2 wherein said optics positioning system further includes:

a positioning drive means energizable under control of the operator;

a first transmission means for connecting said drive means and a first and second of said indicators; and a second transmission means for connecting said drive means and a third and fourth of said indicators, whereby said first and third of said indicators are grouped as a set of indicators to correspond to a first copy paper size and said second and fourth indicators are grouped as a set of indicators to correspond to a second copy paper size.

4. The machine of claim 1 further including means for positioning said indicators independently such that a selected reduction ratio is indicated by all sets of indicators regardless of copy paper sizes.

5. The machine of claim 3 wherein said optics positioning system further includes:

a positioning drive means energizable under control of the operator;

a first transmission means for connecting said drive means and a first of said indicators;

a second transmission means for connecting a second of said indicators to said drive means;

a third transmission means for connecting a third of said indicators to said drive means; and a fourth transmission means for connecting a fourth of said indicators to said drive means, whereby said first and second of said indicators are grouped as a set of indicators to correspond to a first copy paper size and said third and fourth of said indicators are grouped as a set of indicators to correspond to a second copy paper size.

* * * * *